United States Patent
Kim et al.

(10) Patent No.: US 6,954,018 B2
(45) Date of Patent: Oct. 11, 2005

(54) ROTOR OF LINE START PERMANENT MAGNET MOTOR AND MANUFACTURING METHOD THEREOF

(75) Inventors: Young-Kwan Kim, Buchun (KR); Deok-Jin Kim, Seoul (KR); Jin-Soo Park, Incheon (KR)

(73) Assignee: LG Electronics Inc., Seoul (KR)

( * ) Notice: Subject to any disclaimer, the term of this patent is extended or adjusted under 35 U.S.C. 154(b) by 50 days.

(21) Appl. No.: 10/750,931

(22) Filed: Dec. 30, 2003

(65) Prior Publication Data

US 2004/0256939 A1 Dec. 23, 2004

(30) Foreign Application Priority Data

Jun. 18, 2003 (KR) .................................. 10-2003-0039493

(51) Int. Cl.[7] .............................................. H02K 21/12
(52) U.S. Cl. .................................... 310/156.53; 310/89
(58) Field of Search .......... 310/89, 91, 156.22–156.23, 310/156.53, 270

(56) References Cited

U.S. PATENT DOCUMENTS 5,350,958 A * 9/1994 Ohnishi ........................ 310/52
5,581,140 A * 12/1996 Futami et al. .......... 310/156.53
5,936,323 A * 8/1999 Shibukawa et al. .... 310/156.53

FOREIGN PATENT DOCUMENTS

KR 1020000001924 A 1/2000

\* cited by examiner

Primary Examiner—Thanh Lam
(74) Attorney, Agent, or Firm—Lee, Hong, Degerman, Kang & Schmadeka

(57) ABSTRACT

Disclosed are a rotor of a line start permanent magnet motor and a manufacturing method thereof. The rotor comprises: a core provided with an axial hole for inserting a shaft and a plurality of penetrated magnet coupling holes formed at a periphery of the axial hole; permanent magnets respectively coupled to the magnet coupling holes of the core; a third end ring provided with magnet paths for respectively passing the permanent magnets and coupled to one side surface of the core; a fourth end ring having the same appearance as the third end ring and coupled to another side surface of the core to be connected with the third end ring; a magnet supporting plate positioned between one side surface of the core and the fourth end ring for preventing the permanent magnets from being separated; and a fixing member inserted into the magnet paths of the third end ring for preventing the permanent magnets from being separated. Accordingly, the structure and the manufacturing process are simplified thus to improve a synchronization performance, thereby enhancing efficiency of the line start permanent magnet motor, reducing a manufacturing cost, and enhancing an assembly productivity.

10 Claims, 7 Drawing Sheets

ROTOR OF LINE START PERMANENT MAGNET MOTOR AND MANUFACTURING METHOD THEREOF

BACKGROUND OF THE INVENTION

1. Field of the Invention

The present invention relates to a line start permanent magnet motor, and more particularly, to a rotor of a line start permanent magnet motor capable of reducing a rotor resistance of a rotor, thus improving a synchronization performance, and simplifying an assembly process and a manufacturing method thereof.

2. Description of the Conventional Art

Generally, an induction motor has an operational principle that a current is applied to a coil wound at an inner portion of a stator thus to generate a rotation magnetic field and thereby an electromotive force is induced to a rotor rotatably inserted into inside of the stator thus to rotate the rotor.

Meanwhile, a line start permanent magnet motor has a structure that a permanent magnet is inserted into to a rotor constituting the induction motor. The line start permanent magnet motor is operated by a torque generated by an interaction between a secondary current generated by a voltage generated at the rotor at the time of driving and a magnetic flux generated by a winding coil of the stator. At this time, the torque is operated by composing a torque component by a rotor cage, a reluctance torque component, and a component by a permanent magnet.

Then, at the time of a rated operation after starting, a flux of the permanent magnet coupled to the rotor and a flux generated from the stator are reciprocally synchronized, so that the rotor is operated as a rotation magnetic field speed of the stator. At this time, most of the torque is the permanent magnet torque component.

The line start permanent magnet motor can be at once started as a supply voltage without using an additional position sensor or a drive. Also, since an excited current is not required differently from the induction motor and current does not flow into the rotor cage at a synchronous speed, a secondary eddy current loss can be reduced thus to enhance efficiency than other motors.

Meanwhile, the line start permanent magnet motor serves as a rotation resistance at the time of rotation according to a structure of the rotor thus to influence to the rotor torque, thereby lowering a synchronization performance thereof.

FIG. 1 is a sectional view showing a rotor of a line start permanent magnet motor in accordance with the conventional art, FIG. 2 is a left sectional view of the rotor of a line start permanent magnet motor in accordance with the conventional art, and FIG. 3 is a right sectional view of the rotor of a line start permanent magnet motor in accordance with the conventional art. As shown, the rotor of a line start permanent magnet motor is composed of a first end ring 20 and a second end ring 30 asymmetrically formed at both sides of a stacked core 10 to inside thereof an shaft is coupled, and the first and second end rings 20 and 30 are connected to each other by a plurality of connecting portions 21 penetrating the stacked core 10. The stacked core 10 is constituted with a cylindrical body 11 of a cylindrical shape having a constant length; an axial hole 12 formed in the middle of the cylindrical body 11 for inserting an shaft; a plurality of first penetration holes 13 formed at an edge of the cylindrical body 11 for inserting the connecting portions 21; and a plurality of second penetration holes 14 and quadrangular penetration holes 15 formed in the cylindrical body 11. The stacked core 10 is a stacked body that a plurality of thin plates having a constant thickness are stacked.

The first end ring 20 is provided with a rivet portion 23 formed at one side of a ring-shaped body portion 22 of a ring shape having a constant thickness and respectively inserted into the second penetration holes 14, and the second end ring 30 is provided with insertion penetration holes 32 of a hexagon shape of a non-circular shape formed in a ring-shaped body portion 31 having a constant thickness. The ring-shaped body portion 22 of the first end ring and the ring-shaped body portion 31 of the second end ring are connected to each other by the connecting portions 21.

The stacked core 10, the first end ring 20, and the second end ring 30 constitute one circuit.

Also, permanent magnets 40 are penetratingly inserted into the quadrangular penetration holes 15 of the stacked core 10, and the permanent magnets 40 are arranged in a state that two permanent magnets are facing each other, respectively.

A supporting plate 50 for supporting the permanent magnets 40 is coupled between the first end ring 20 and the stacked core 10, and a covering plate 60 for covering the permanent magnets 40 is inserted into the second end ring 30 thus to be coupled to one side surface of the stacked core 10. The supporting plate 50 is formed with a constant thickness and as a corresponding shape to one side surface of the stacked core 10, in which the quadrangular penetration holes 15 were excluded. The covering plate 60 of a hexagon shape for covering the permanent magnets 40 is provided with an axial hole 61 formed in the middle thereof, and a rivet hole 62 formed at both sides of the axial hole 61. The covering plate 60 is fixedly coupled by inserting the rivet hole 62 of the covering plate into the rivet portion 23 of the first end ring in a state that the covering plate 60 is inserted into the insertion penetration holes 32 of the second end ring 30.

Manufacturing processes for the rotor of a line start permanent magnet motor will be explained as follows.

FIG. 4 is a flow chart showing a manufacturing method of the rotor of a line start permanent magnet motor in accordance with the conventional art. As shown, the method comprises the steps of: stacking thin plates constituting the stacked core 10 and thereby manufacturing the stacked core 10; coupling the supporting plate 50 to one side surface of the stacked core 10, performing Al die casting on the stacked core 10, and thereby forming the first and second end rings 20 and 30, in which Al is not introduced into the quadrangular penetration holes 15 of the stacked core 10 by the supporting plate 50; respectively inserting permanent magnets 40 into the quadrangular penetration holes 15 of the stacked core 10 through the insertion penetration holes 32 of the second end ring; inserting the covering plate 60 into the insertion penetration holes 32 of the second end ring and thereby covering the permanent magnets 40, in which the rivet hole 62 of the covering plate is inserted into the rivet portion 23 of the first end ring; and riveting the rivet portion 23 and thereby fixing the covering plate 60.

The rotor manufactured by said processes is rotatably inserted into the stator constituting the line start permanent magnet motor, and the shaft is fixedly coupled to the axial hole 12 of the rotor.

The rotor of the line start permanent magnet motor is rotated by the aforementioned electromagnetic operation according to an operation of the line start permanent magnet motor, thereby transmitting a rotational force to another system through the shaft.

However, in the rotor of the line start permanent magnet motor, since the second end ring 30 coupled to one side of the stacked core 10 is formed as a shape that the permanent magnets 40 and the covering plate 60 can be penetratingly inserted, the second end ring 30 is formed asymmetrically and a shape of the second end ring 30 is different from a shape of the first end ring 20 thus to generate a rotation imbalance when the rotor is rotated. Also, by a shape of the insertion penetration holes 32 of the second end ring 30, a sectional area of the second end ring 30 becomes small, thereby increasing a secondary resistance and thus lowering a synchronization performance. Additionally, since the covering plate 60 for covering the permanent magnets 40 is coupled by the riveting, an assembly structure becomes complicated thus to lower an assembly productivity.

SUMMARY OF THE INVENTION

Therefore, an object of the present invention is to provide to a rotor of a line start permanent magnet motor capable of reducing a secondary resistance according to a rotation resistance of a rotor, thus improving a synchronization performance, and simplifying an assembly process and a manufacturing method thereof.

To achieve these and other advantages and in accordance with the purpose of the present invention, as embodied and broadly described herein, there is provided a rotor of a line start permanent magnet motor comprising: a core provided with an axial hole for inserting an shaft and a plurality of penetrated magnet coupling holes formed at a periphery of the axial hole; permanent magnets respectively coupled to the magnet coupling holes of the core; a third end ring provided with magnet paths for respectively passing the permanent magnets and coupled to one side surface of the core; a fourth end ring having the same appearance as the third end ring and coupled to another side surface of the core to be connected with the third end ring; a magnet supporting plate positioned between one side surface of the core and the fourth end ring for preventing the permanent magnets from being separated; and a fixing member inserted into the magnet paths of the third end ring for preventing the permanent magnets from being separated.

To achieve these and other advantages and in accordance with the purpose of the present invention, as embodied and broadly described herein, there is also provided a manufacturing method of a rotor of a line start permanent magnet motor comprising the steps of: stacking a plurality of thin plates having a certain shape and thus manufacturing a core; positioning a magnet supporting plate to one side surface of the core; forming third and fourth end rings having the same appearance by a die casting method at both side surfaces of the core where the magnet supporting plate is positioned; inserting a plurality of permanent magnets to the core through the third end ring and thereby fixing; and fixedly coupling a fixing member to the third end ring in order to prevent the permanent magnets from being separated.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a rotor of a line start permanent magnet motor and a manufacturing method thereof will be explained in more detail.

Figure 1:
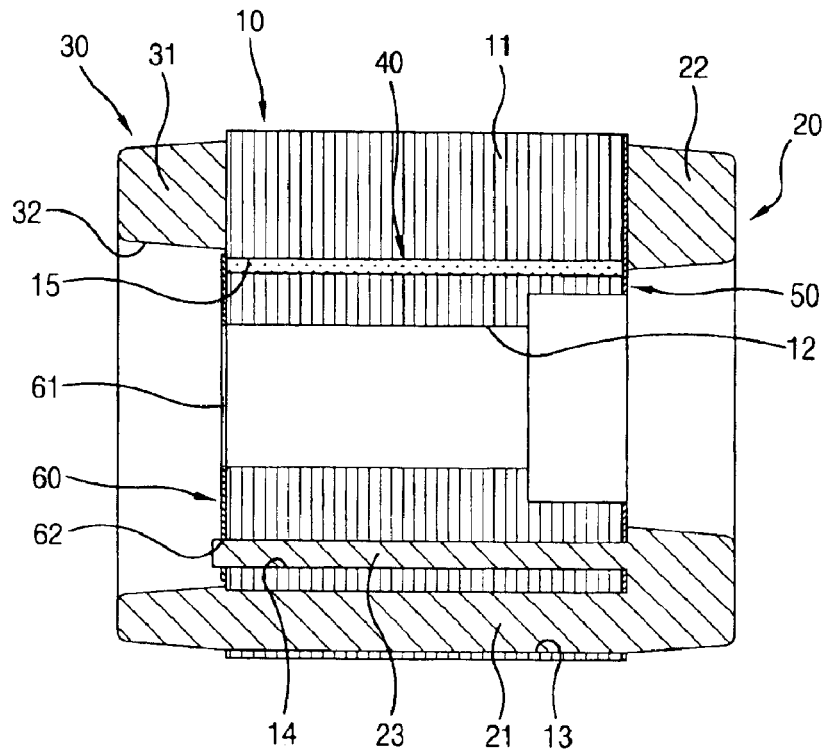
FIG. 1 is a sectional view showing a rotor of a line start permanent magnet motor in accordance with the conventional art.
Figure 2:
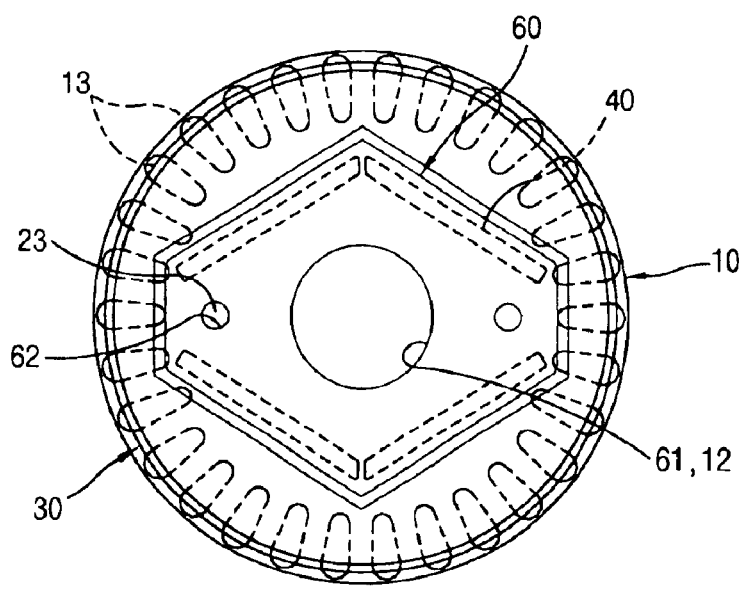
FIG. 2 is a left sectional view of the rotor of a line start permanent magnet motor in accordance with the conventional art.
Figure 3:
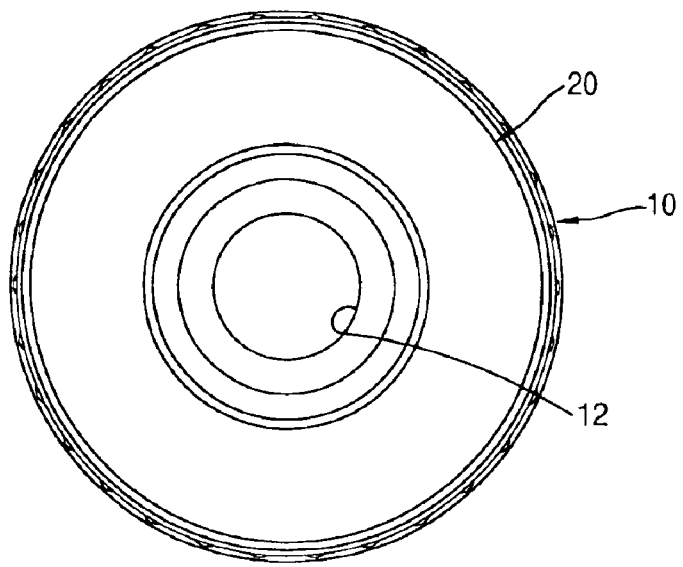
FIG. 3 is a right sectional view of the rotor of a line start permanent magnet motor in accordance with the conventional art.
Figure 4:
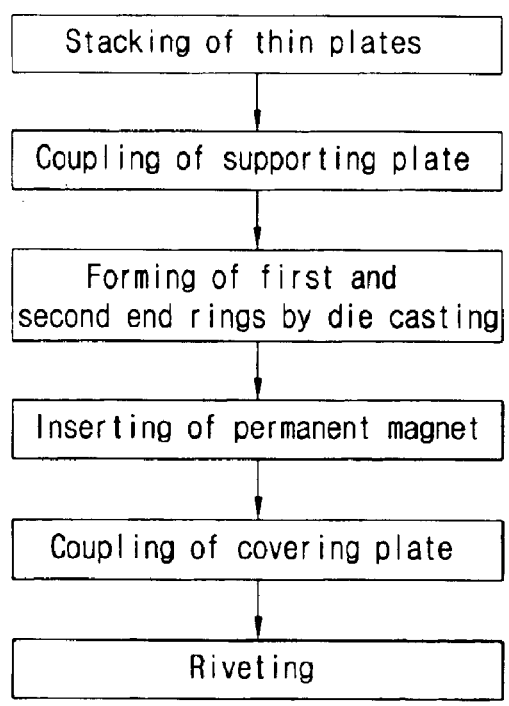
FIG. 4 is a flow chart showing a manufacturing method of the rotor of a line start permanent magnet motor in accordance with the conventional art.
Figure 5:
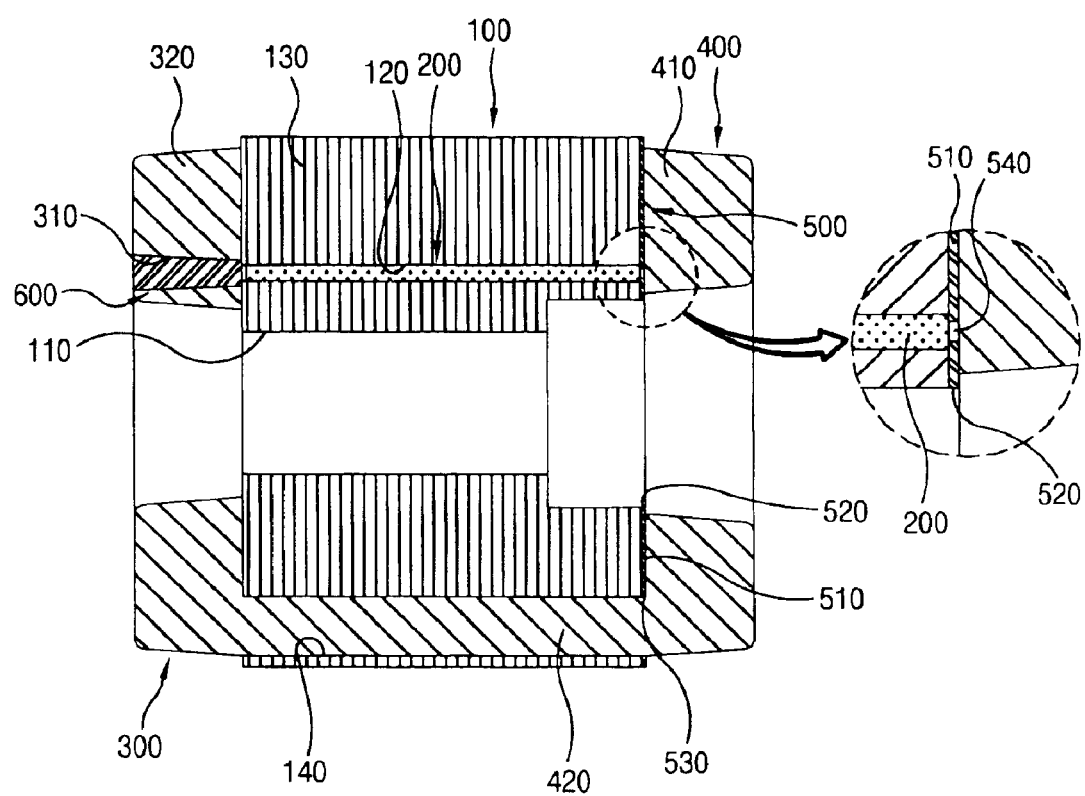
FIG. 5 is a sectional view showing a rotor of a line start permanent magnet motor according to the present invention.
Figure 6:
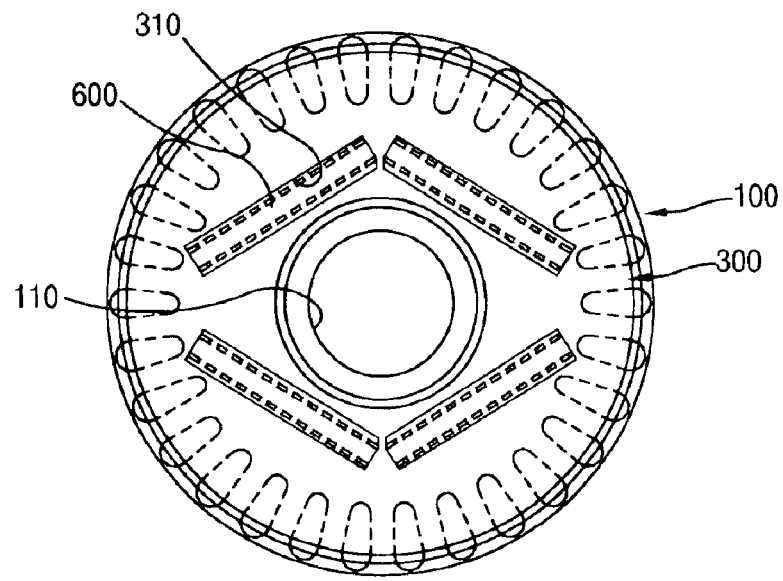
FIG. 6 is a left sectional view of the rotor of a line start permanent magnet motor according to the present invention.
Figure 7:
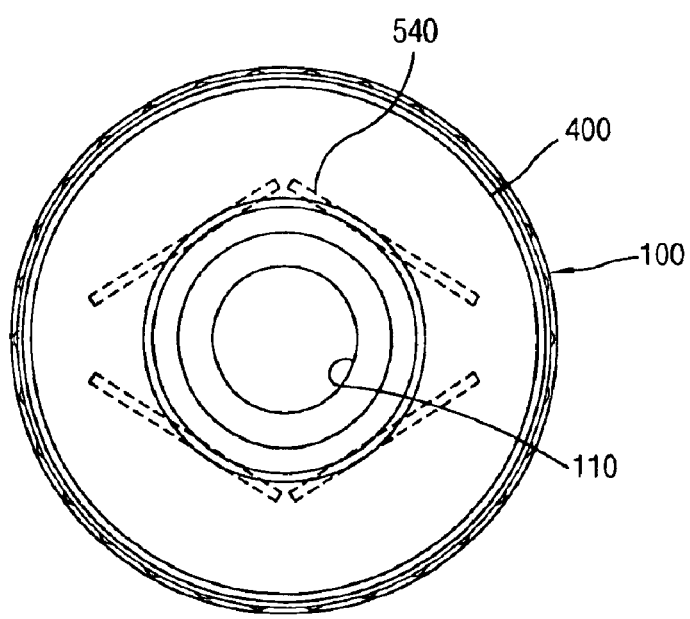
FIG. 7 is a right sectional view of the rotor of a line start permanent magnet motor according to the present invention.

FIG. 5 is a sectional view showing a rotor of a line start permanent magnet motor according to the present invention, FIG. 6 is a left sectional view of the rotor of a line start permanent magnet motor according to the present invention, and FIG. 7 is a right sectional view of the rotor of a line start permanent magnet motor according to the present invention.

As shown, the rotor of a line start permanent magnet motor comprises: a core 100 provided with an axial hole 110 for inserting an shaft and a plurality of penetrated magnet coupling holes 120 formed at a periphery of the axial hole 110; permanent magnets 200 respectively coupled to the magnet coupling holes 120 of the core 100; a third end ring 300 provided with magnet paths 310 for respectively inserting the permanent magnets 200 and coupled to one side surface of the core 100; a fourth end ring 400 having the same appearance as the third end ring 300 and coupled to another side surface of the core 100 to be connected with the third end ring 300; a magnet supporting plate 500 positioned between one side surface of the core 100 and the fourth end ring 400 for preventing the permanent magnets 200 from being separated; and a fixing member 600 inserted into the magnet paths 310 of the third end ring 300 for preventing the permanent magnets 200 from being separated.

The core 100 is provided with an axial hole 110 for inserting an shaft into inside of a cylindrical body 130 of a cylindrical shape having a constant length and an outer diameter. A plurality of penetration holes 140 are formed at an edge of the cylindrical body 130, and a plurality of magnet coupling holes 120 are formed between the axial hole 110 and the penetration holes 140. The magnet coupling is holes 120 have a sectional surface of a quadrangular shape having a constant width and length. The magnet coupling holes 120 are arranged in a state that two holes are facing each other, respectively and has a sectional surface of a quadrangular shape having a constant width and length. The magnet coupling holes 120 are arranged in a state that two holes are facing each other, respectively. The core 100 is a stacked body that a plurality of thin plates having a constant thickness corresponding to a lateral shape of the cylindrical body 130 are stacked. The core 100 can be also formed as a processed shape of a non-stacked body.

The permanent magnets 200 are formed as a corresponding shape to a shape of the magnet coupling holes 120 of the core. That is, the permanent magnets 200 have a constant length and have a sectional surface of a quadrangular shape. The permanent magnets 200 are respectively inserted into the magnet coupling holes 120 of the core and thereby fixed.

The third end ring 300 is provided with a plurality of magnet paths 310 formed in a ring-shaped body 320 of a ring shape having a constant width as insertion paths of the permanent magnets 200. An inner diameter of the third end ring 300 is formed to be smaller than a diameter of an inner tangential circle connecting inner tangent lines of the permanent magnets 200. Also, an outer diameter of the third end ring 300 is formed to be larger than a diameter of an outer tangential circle connecting outer tangent lines of the permanent magnets 200. The magnet paths 310 of the third end ring are arranged in accordance with positions of the magnet coupling holes 120 of the core. The magnet paths 310 of the third end ring have sectional surfaces of a quadrangular shape, and are formed as an inclined shape that a hole positioned at a side of the core 100 is small and a hole positioned at the opposite side is large. When the third end ring 300 is coupled to one side surface of the core 100, the magnet paths 310 are correspondingly coupled to the magnet coupling holes 120 of the core.

The fixing member 600 inserted into the magnet paths 310 is formed of the same material as the third end ring 300, and formed as the same shape as the magnet paths 310. That is, the fixing member 600 has the same length as a depth of the magnet paths 310 of the third end ring, and is formed as a wedge shape that one side sectional area is smaller than another side sectional area.

An appearance of the fourth end ring 400 is formed to be the same as that of the third end ring 300. That is, the fourth end ring 400 is formed as a ring-shaped body 410 of a ring shape having a constant width. An inner diameter of the fourth end ring 400 is formed to be smaller than a diameter of an inner tangential circle connecting inner tangent lines of the permanent magnets 200. Also, an outer diameter of the fourth end ring 400 is formed to be larger than a diameter of an outer tangential circle connecting outer tangent lines of the permanent magnets 200.

The third end ring 300 and the fourth end ring 400 are connected to each other by a connecting portion 420 respectively inserted into the penetration holes 140 of the core. The third end ring 300, the fourth end ring 400, and the connecting portion 420 are formed of the same material. The core 100, the third/fourth end rings 300/400, and the connecting portion 420 constitute one circuit.

The magnet supporting plate 500 is provided with an axial hole 520 formed in a cylindrical plate 510 having a constant thickness, and penetration holes 530 formed at an edge thereof in accordance with the penetration holes 140 of the core. Also, a slit 540 having a constant width and length for preventing a magnet flux of the permanent magnets 200 is formed at the cylindrical plate 510 in accordance with the permanent magnets 200. The width and length of the slit 540 are formed to be smaller than those of the permanent magnets 200.

One embodiment of a manufacturing method of the rotor of the line start permanent magnet motor according to the present invention will be explained as follows.

Figure 8:
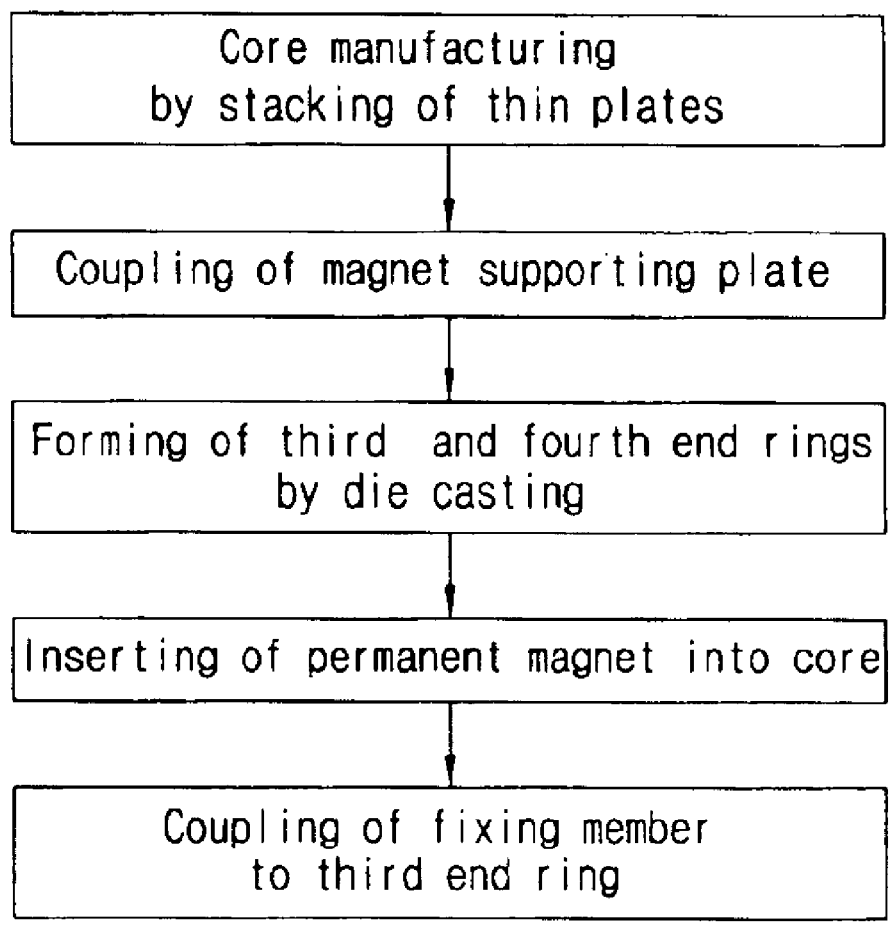
FIG. 8 is a flow chart showing a manufacturing method of the rotor of a line start permanent magnet motor according to the present invention.

FIG. 8 is a flow chart showing the manufacturing method of the rotor of a line start permanent magnet motor according to the present invention. As shown, first, a plurality of thin plates having a certain shape are stacked thus to manufacture the core 100. Then, the magnet supporting plate 500 is positioned at one side surface of the core 100. Then, the third and fourth end rings 300 and 400 having the same appearance are formed by a die casting method at both side surfaces of the core 100 where the magnet supporting plate 500 is positioned. That is, the core 100 to which the magnet supporting plate 500 is attached is inserted into a mold formed as a predetermined shape and then melted Al is injected into the mold, thereby forming the third and fourth end rings 300 and 400. Then, the permanent magnets 200 are respectively pressed-inserted into the magnet coupling holes 120 formed at the core 100 through the magnet paths 310 formed at the third end ring 300, thereby being fixedly coupled. Then, the fixing member is respectively coupled to the magnet paths 310 of the third end ring and thus to be coupled.

The rotor manufactured by said processes is rotatably inserted into the stator constituting the line start permanent magnet motor, and the shaft is coupled to the axial hole of the rotor. The stator is provided with a winding coil.

Hereinafter, the rotor of the line start permanent magnet motor according to the present invention and operational effects of the manufacturing method thereof will be explained.

First, in the line start permanent magnet motor provided with the rotor, the rotor is operated by a torque generated by an interaction between a secondary current generated by a voltage generated at the rotor at the time of driving and a magnetic flux generated by a winding coil of the stator. Then, at the time of a rated operation after driving, a flux of the permanent magnets coupled to the rotor and a flux generated from the stator are reciprocally synchronized, so that the rotor is operated as a rotation magnetic field speed of the stator. At this time, most of the torque is the permanent magnet torque component. A rotational force of the rotor is transmitted to another system through the shaft.

Figure 9:
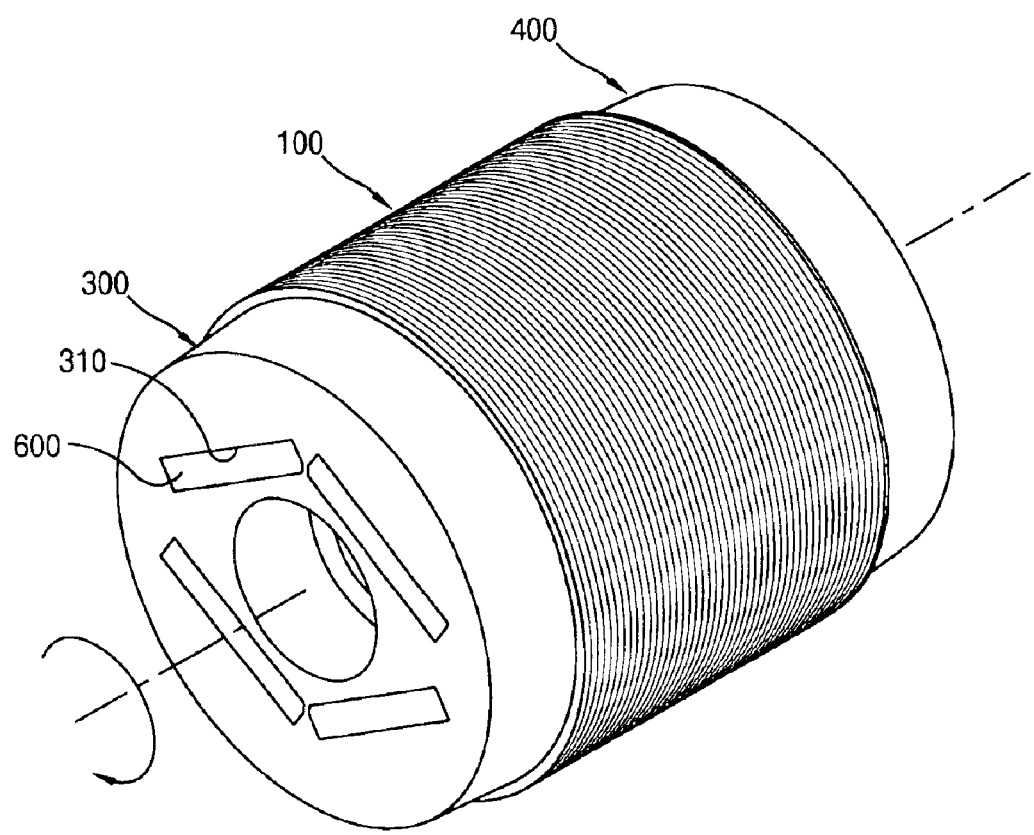
FIG. 9 is a perspective view showing a line start permanent magnet motor according to the present invention.
Figure 10:
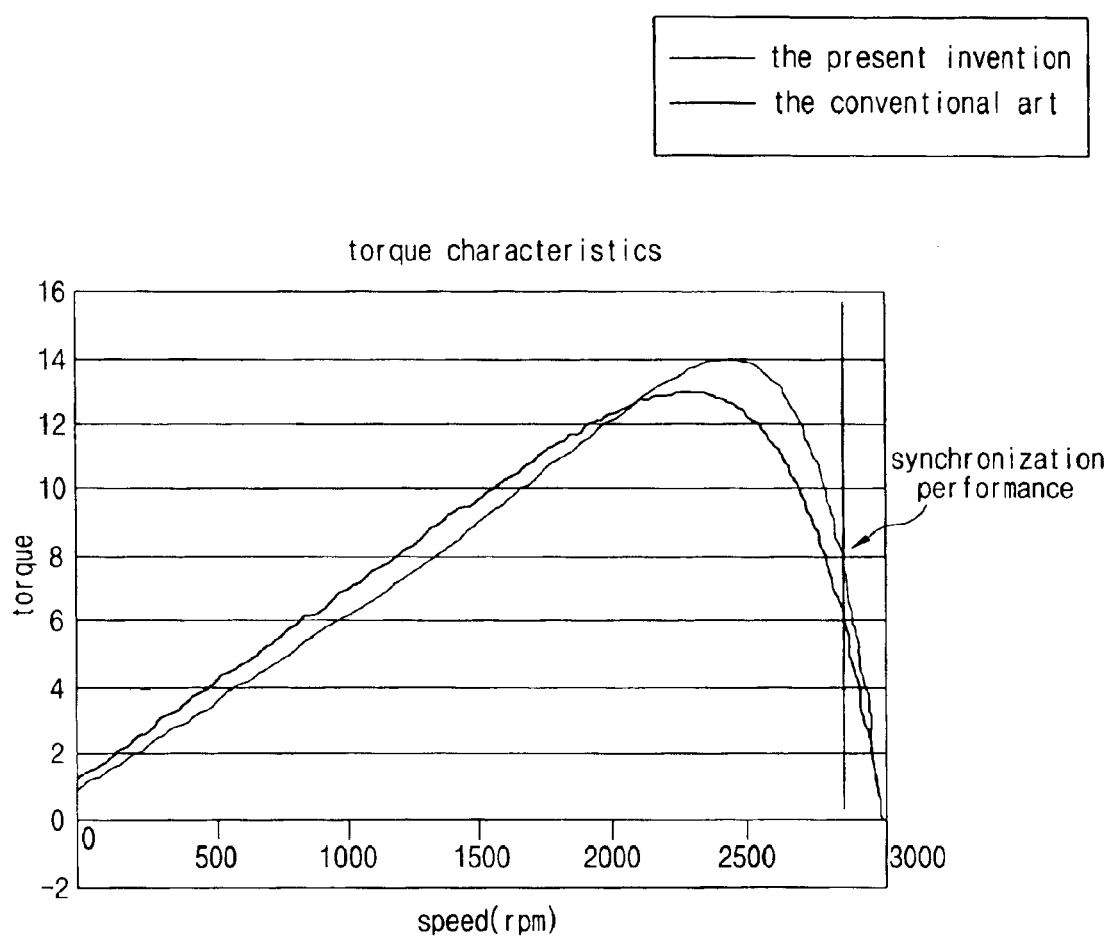
FIG. 10 is a graph comparing a synchronization performance according to the conventional art with a synchronization performance according to the present invention.

Herein, when the rotor is rotated, the rotor is uniformly formed and an appearance thereof is smoothly formed thus to minimize a rotation resistance. That is, as shown in FIG. 9, since the third end ring 300 and the fourth end ring 400 constituting the rotor have the same appearance and weight, the rotor is balanced. Also, since a plane is formed in a state that the fixing member 600 is inserted into a lateral surface of the third end ring 300, a rotation resistance is minimized when the rotor is rotated. Accordingly, as shown in FIG. 10, a torque greater than a conventional torque is generated at a speed similar to a synchronization speed thus to enhance a synchronization performance.

Also, in the present invention, since the fixing member 600 is pressed-inserted into the third end ring 300 thus to fix the permanent magnets 200 at the time of manufacturing, the conventional process that the covering plate 60 is coupled and the covering plate 60 is fixed by a riveting is excluded, thereby simplifying the structure and the manufacturing processes.

As aforementioned, in the rotor of the line start permanent magnet motor according to the present invention and the manufacturing method thereof, the rotation resistance is minimized when the rotor is rotated, thereby improving a synchronization performance of the line start permanent magnet motor and thus enhancing efficiency of the line start permanent magnet motor. Also, the manufacturing process and the structure are simplified, thereby reducing a manufacturing cost and enhancing a productivity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rotor of a line start permanent magnet motor comprising:
    a core provided with an axial hole for inserting an shaft and a plurality of penetrated magnet coupling holes formed at a periphery of the axial hole;
    permanent magnets respectively coupled to the magnet coupling holes of the core;
    a third end ring provided with magnet paths for respectively passing the permanent magnets and coupled to one side surface of the core;
    a fourth end ring having the same appearance as the third end ring and coupled to another side surface of the core to be connected with the third end ring;
    a magnet supporting plate positioned between one side surface of the core and the fourth end ring for preventing the permanent magnets from being separated; and
    a fixing member inserted into the magnet paths of the third end ring for preventing the permanent magnets from being separated.

2. The rotor of claim 1, wherein the core is a stacked body that a plurality of circular thin plates having a certain thickness are stacked.

3. The rotor of claim 1, wherein inner diameters of the third end ring and the fourth end ring are formed to be smaller than a diameter of an inner tangential circle connecting inner tangent lines of the permanent magnets.

4. The rotor of claim 1, wherein outer diameters of the third end ring and the fourth end ring are formed to be larger than a diameter of an outer tangential circle connecting inner tangent lines of the permanent magnets.

5. The rotor of claim 1, wherein the magnet paths of the third end ring are formed as an inclined shape that a hole positioned at the core side is small and a hole positioned at the opposite side is large, and the fixing member inserted into the magnet paths is formed as a wedge shape which is the same as a shape of the magnet paths.

6. The rotor of claim 1, wherein a depth of the magnet paths of the third end ring and a length of the fixing member are equal.

7. The rotor of claim 1, wherein the fixing member is formed of the same material as the third and fourth end rings.

8. The rotor of claim 1, wherein the permanent magnets are pressed-inserted into the magnet coupling holes of the core and thereby coupled.

9. The rotor of claim 1, wherein a slit having a constant width and length for preventing a magnet flux leakage of the permanent magnets is formed at the cylindrical plate in accordance with the permanent magnets.

10. A manufacturing method of a rotor of a line start permanent magnet motor comprising the steps of:
    stacking a plurality of thin plates having a certain shape and thus manufacturing a core;
    positioning a magnet supporting plate to one side surface of the core;
    forming third and fourth end rings having the same appearance by a die casting at both side surfaces of the core where the magnet supporting plate is positioned;
    inserting a plurality of permanent magnets to the core through the third end ring and thereby fixing; and
    respectively fixed-coupling a fixing member to the third end ring in order to prevent the permanent magnets from being separated.

* * * * *